United States Patent
Colosky

(10) Patent No.: US 7,254,470 B2
(45) Date of Patent: Aug. 7, 2007

(54) FAULT TOLERANT TORQUE SENSOR SIGNAL PROCESSING

(75) Inventor: Mark P. Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 763 days.

(21) Appl. No.: 10/232,015

(22) Filed: Aug. 28, 2002

(65) Prior Publication Data

US 2003/0233181 A1    Dec. 18, 2003

Related U.S. Application Data

(60) Provisional application No. 60/389,210, filed on Jun. 17, 2002.

(51) Int. Cl.
*B62D 6/00* (2006.01)

(52) U.S. Cl. .............................. 701/43; 701/29; 701/34; 340/438; 340/439

(58) Field of Classification Search ................. 701/29, 701/41, 43, 34; 73/118.1, 862.321, 862.324, 73/862.325; 324/207.11, 207.12, 207.13, 324/207.14; 318/432, 434; 702/108, 113, 702/116, 183, 185; 340/438, 439; 180/400, 180/443, 445
See application file for complete search history.

(56) References Cited

U.S. PATENT DOCUMENTS

| | | | | |
|---|---|---|---|---|
| 5,253,725 A | * | 10/1993 | Nishimoto | 180/79.1 |
| 5,668,721 A | * | 9/1997 | Chandy | 701/41 |
| 5,763,793 A | * | 6/1998 | Ng et al. | 73/862.326 |
| 5,837,908 A | * | 11/1998 | Ng et al. | 73/862.326 |
| 6,073,262 A | * | 6/2000 | Larkin et al. | 714/736 |
| 6,122,579 A | * | 9/2000 | Collier-Hallman et al. | 701/41 |
| 6,195,758 B1 | * | 2/2001 | Lundh et al. | 713/500 |
| 6,289,748 B1 | | 9/2001 | Lin et al. | |
| 6,328,128 B1 | * | 12/2001 | Chikaraishi | 180/446 |
| 6,389,338 B1 | * | 5/2002 | Chandy et al. | 701/29 |
| 6,404,156 B1 | * | 6/2002 | Okanoue et al. | 318/432 |
| 6,427,527 B1 | * | 8/2002 | Langer | 73/118.1 |
| 6,465,975 B1 | | 10/2002 | Naidu | |
| 6,570,647 B1 | * | 5/2003 | Meili | 356/28 |

* cited by examiner

*Primary Examiner*—Gertrude A. Jeanglaude
(74) *Attorney, Agent, or Firm*—Michael D. Smith

(57) ABSTRACT

A method for generatig a fault tolerant sensor signal for a motor control system in a vehicle steering system. The method includes receiving at least three sensor signals indicative of a sensed parameter and generating a plurality of parameter pair signals responsive to the at least one sensor signal of the at least three sensor signals. Additionally, the method includes selecting one parameter pair signal of the plurality of parameter pair signals and generating a measured parameter signal responsive to the selecting.

17 Claims, 3 Drawing Sheets

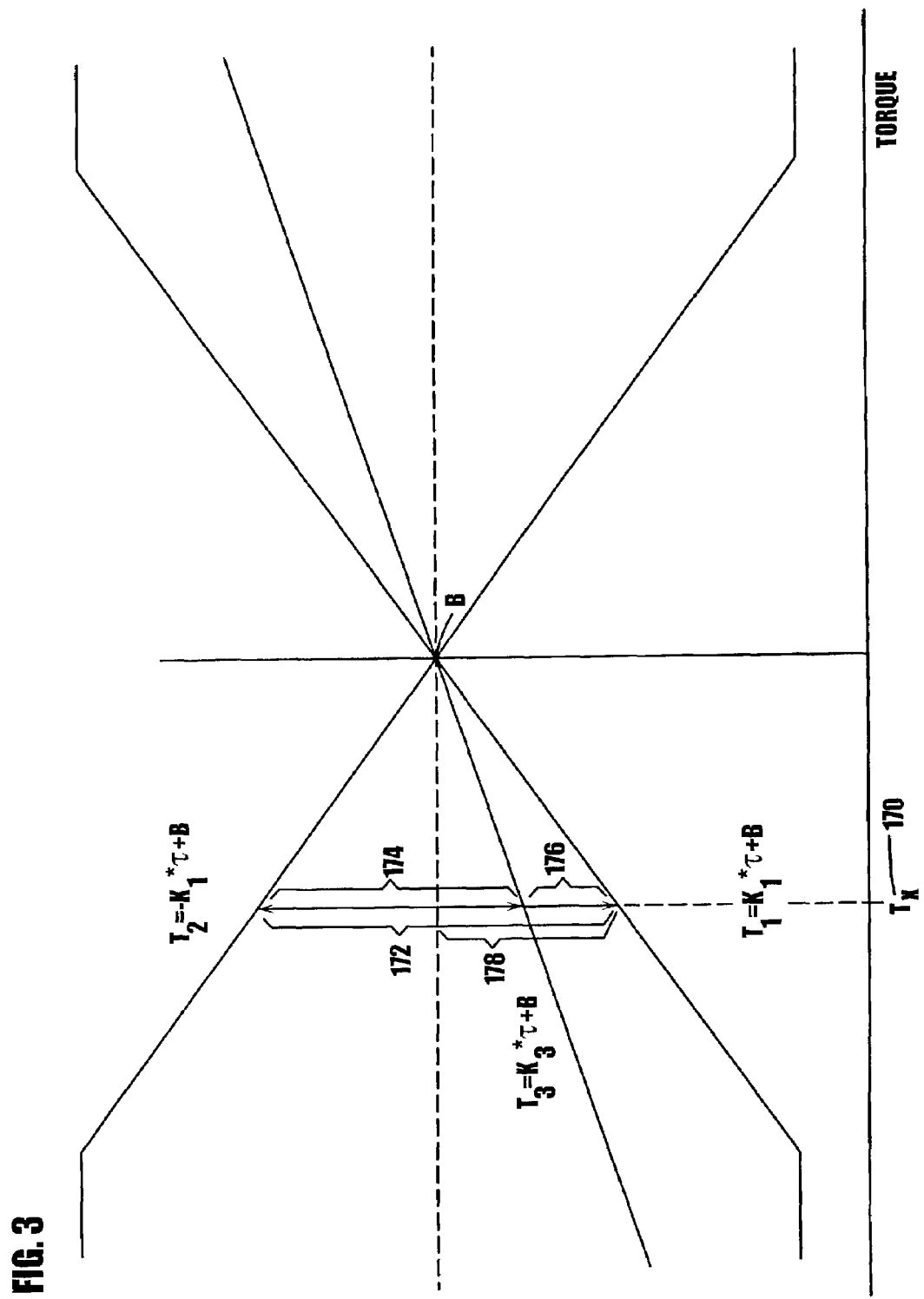

FAULT TOLERANT TORQUE SENSOR SIGNAL PROCESSING

CROSS-REFERENCE TO RELATED APPLICATIONS

This application claims the benefit of U.S. provisional application No. 60/389,210, filed Jun. 17, 2002 the contents of which are incorporated by reference herein in their entirety.

BACKGROUND

This invention relates to the signal processing associated with fault tolerant multiple sensor signals, and more particularly, to multiple torque sensor reasonableness diagnostics to ensure fault tolerance.

Many control systems employ multiple sensors to achieve some level of fault tolerance. In some systems, two sensors are employed, providing confidence that if a sensor fails response to the failed sensors may be controlled in a deterministic manner. Under such conditions, continued operation may not be possible, but at least the response to a loss of a sensor may be constrained. In other systems, three or more sensors may be employed to provide complete redundancy, and thereby providing some level of tolerance to a particularized fault as voting among the sensors and their inputs may now be accomplished.

However, additional sensors inherently require additional integration packaging, complexity, and interface signal processing, all of which add cost. Therefore, it would be beneficial to provide deterministic fault tolerance while employing a minimum of redundant sensors and signal processing interfaces.

BRIEF SUMMARY

Disclosed herein is a method of generating a fault tolerant sensor signal for a motor control system in a vehicle steering system. The method includes receiving at least three sensor signals indicative of a sensed parameter and generating a plurality of parameter pair signals responsive to the least one sensor signal of the at least three sensor signals. Additionally, the method includes selecting one parameter pair signal of the plurality of parameter pair signals and generating a measured parameter signal responsive to the selecting. Also disclosed herein the method further comprises generating a plurality of diagnostic signals responsive to at least one of the at least three sensor signals.

Also disclosed herein is a system for implementing the method of generating a fault tolerant sensor signal for a motor control system in a vehicle steering system. Further disclosed herein is a storage medium encoded with a machine-readable computer program code for generating a fault tolerant sensor signal for a motor control system in a vehicle steering system, said storage medium including instructions for causing controller to implement the above-mentioned method. Further disclosed herein is a computer data signal embodied in a carrier wave for generating a fault tolerant sensor signal for a motor control system in a vehicle steering system, said data signal comprising code configured to cause a controller to implement the method disclosed herein.

BRIEF DESCRIPTION OF THE DRAWINGS

The present invention will now be described, by way of an example, with references to the accompanying drawings, wherein like elements are numbered alike in the several figures in which:

FIG. 3 is diagram depicting an exemplary set of selected sensor responses, as applied to an illustrative torque sensor.

DESCRIPTION OF AN EXEMPLARY EMBODIMENT

Figure 1:
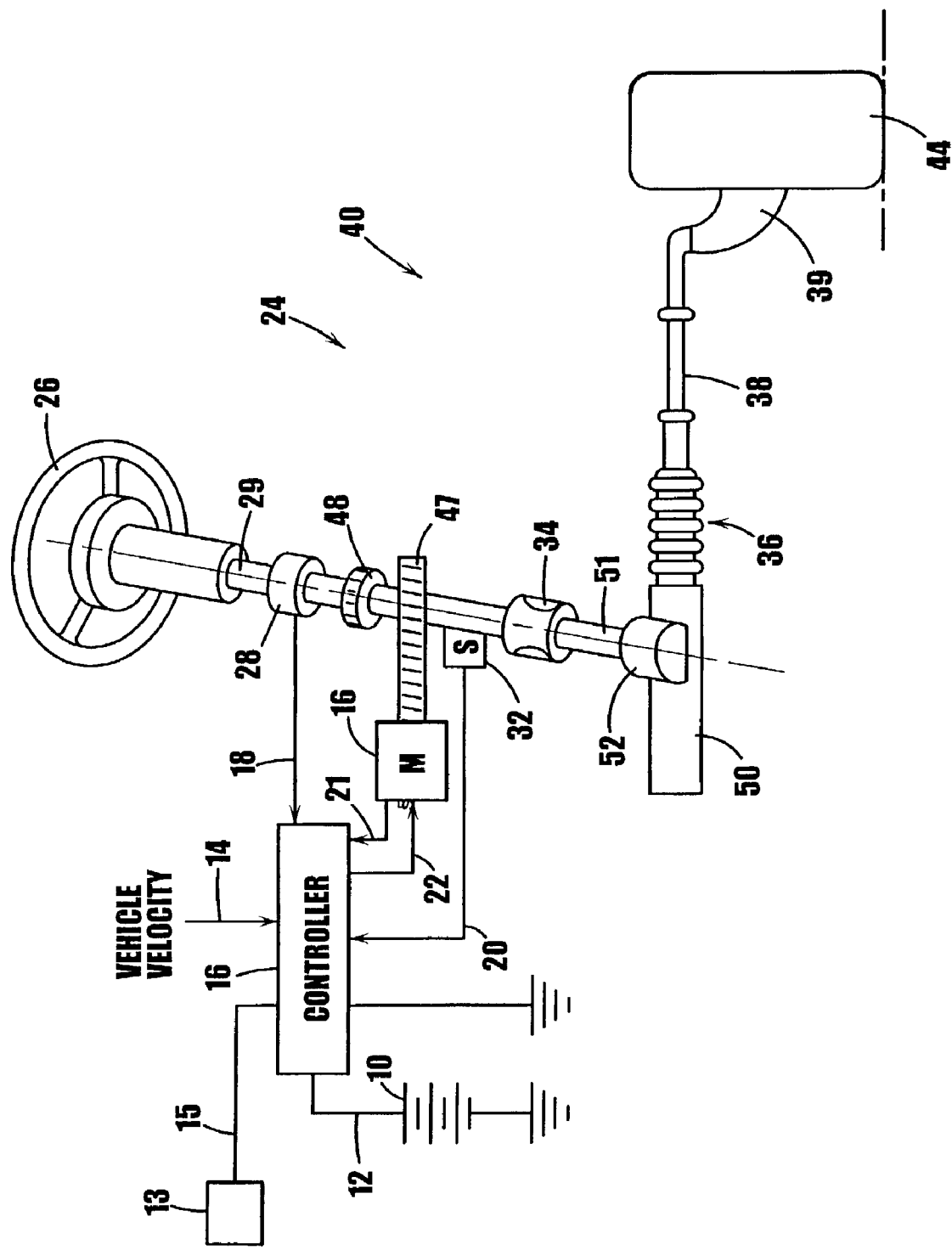
FIG. 1 depicts an electric power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the steering wheel 26 is turned, the steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and the electric motor 46. The controller 16 is powered by the vehicle power supply 10 through line 12. The controller 16 receives a vehicle speed signal 14 representative of the vehicle velocity. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as, the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any instance where fault tolerant sensor inputs are desired. Moreover, the references and descriptions herein may apply to many forms of parameter sensors, including, but not limited to torque, position, speed and the like. It should also be noted that reference herein to electric machines including, but not limited to, motors, or more specifically sinusoidally excited brushless DC motors, hereafter, for brevity and simplicity, reference will be made to motors only without limitation.

In the control system 24 depicted, the controller 16 is utilized the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown) such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. Such a torque sensor 28 and the torque signal 18 therefrom, may be responsive to a compliant torsion bar, T-bar, spring, or similar apparatus configured to provide a response indicative of the torque applied.

The position signal 20, velocity signal 21, and a torque signal(s) 18 among others, are applied to the controller 16. The torque signal(s) 18 is representative of the desired motor torque value. The controller 16 processes all input signals to generate values corresponding to each of the signals resulting in a rotor position value, a motor speed value, and a torque value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the fault tolerant torque sensor signal processing and diagnostics algorithm(s), and the like), controller 16 may include, but not be limited to, a processor(s), computer(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
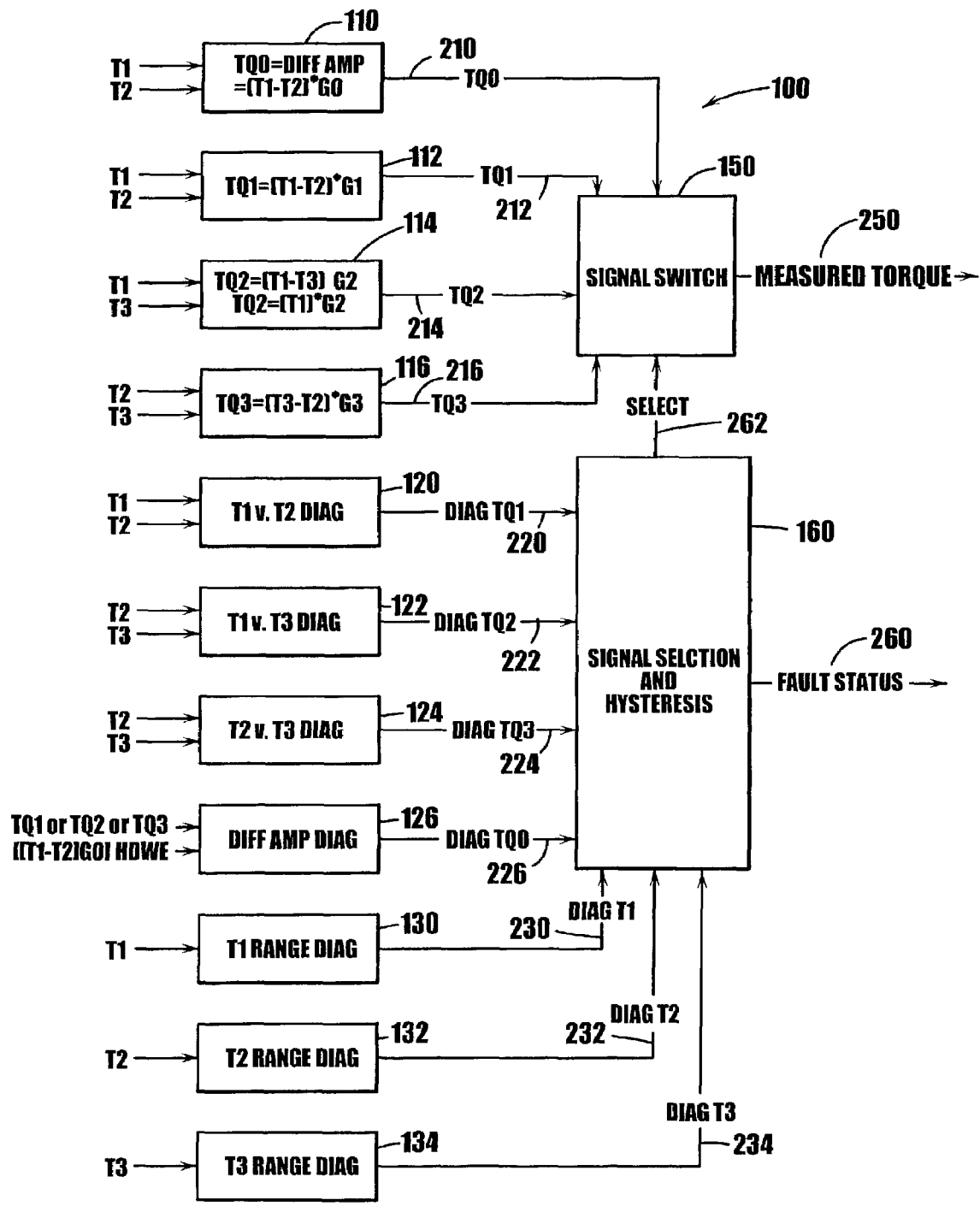
FIG. 2 is a block diagram depicting and exemplary embodiment of the signal processing employed.

As exemplified in a disclosed embodiment as depicted in FIG. 2, one such process may be determining from several torque signal(s) 18, system measurements, parameters, and states the appropriate compensation and characterization of raw torque signals 18 for the torque sensor(s) 28 to enhance the operational availability of a valid torque inputs to the control system 24. Controller 16 receives various input signals including, but not limited to, those identified above, to facilitate such processing and may provide one or more output signals in response. Once again, it will be appreciated that while the embodiment disclosed herein is explained by way of discussion concerning torque signals and torque sensors, other sensors and sensed parameters are equally applicable.

In an exemplary embodiment, the controller 16 obtains as input signals or receives signals to facilitate computing, among others, three torque signals 18a, 18b, and 18c and hereinafter also denoted T1, T2, and T3 respectively, from three torque sensors 28a, 28b, and 28c respectively. Each torque signal 18a, 18b, and 18c is representative of the torque felt/applied by an operator of the vehicle. Also received by the controller 16 are a variety of implementation specific parameters, signals and values for initialization and characterization of the prescribed processes and to identify various states of the processes herein.

Turning now to FIG. 3, there is depicted torque sensor 28 response curves for an exemplary embodiment of the three torque signals 18a, 18b, and 18c or $T_1$, $T_2$, and $T_3$ respectively. The response curves are selected and characterized as depicted to facilitate the processing disclosed herein for an exemplary embodiment. The response characteristics for the three torque signals 18a, 18b, and 18c or $T_1$, $T_2$, and $T_3$ respectively assuming a voltage response to an applied torque are as follows;

$$T_1 = K_1 \tau + B \quad (1)$$

$$T_2 = -K_1 \tau + B \quad (2)$$

$$T_3 = K_3 \tau + B \quad (3)$$

where; $K_1$ is a slope or gain ratio for the torque response in output units/torque unit $K_3$ is another slope or gain ratio for the torque response in output units/torque unit τ is the actual torque as sensed by the sensor in torque units B is a voltage offset of the sensor in output units.

Advantageously, it should be noted that $T_1$ and $T_2$ exhibit similar characteristics, but, of opposite sign, while $T_3$ exhibits similar characteristics to $T_1$ but of different slope. It should be noted that the three torque signals $T_1$, $T_2$, and $T_3$ as depicted are illustrative only. The output ranges and torque ranges for the three torque signals $T_1$, $T_2$, and $T_3$ are selected and configured to provide for the range mandated by a particular implementation rather than a limitation of the embodiments disclosed herein. Additionally it will be appreciated that the ranges for the torque signals $T_1$, and $T_2$, are shown to saturate near the ends of the torque range, while the torque signal $T_3$, at a lower scale factor, extends linearly to a full range of the measured torque. Finally, it should be noted that $K_1$, $K_3$, and B are each defined in terms generalized output units, such unit should not be considered limiting are merely to facilitate description. For example, generally such units might be volts/torque unit and volts. Once again the configuration depicted is illustrative should not be considered as limiting the embodiments disclosed herein.

The selection of the three torque signals $T_1$, $T_2$, and $T_3$ with these characteristics facilitates the processing disclosed at a later point herein. Namely, the various combinations of torque signal pairs as desired to eliminate common mode errors, increase signal range and thereby improve signal to noise ratio, and to facilitate diagnostic computations. Such advantages will be come evident to those skilled in the art with the disclosure of an exemplary embodiment herein.

It will be appreciated that there may exist numerous combinations of two or more of the torque signals $T_1$, $T_2$, and $T_3$. In an exemplary embodiment, the torque signal $T_1$, $T_2$, and $T_3$ may be combined in pairs to formulate differential pairs as desired to eliminate common mode errors. Additionally, depending upon the appropriate selections and characteristics for selected torque signals e.g., $T_1$, $T_2$, and $T_3$ an increase signal range and thereby increased signal to noise ratio may be achieved over using each individual torque signal T, $T_2$, and $T_3$ alone.

Turning now once again to FIG. 2, a block diagram depicting and exemplary embodiment of the torque signal and diagnostics processing 100 executed to establish and select a desired measured torque signal 250 that exhibits robust fault tolerance and a fault status signal 260 indicative of the status of the torque signals $T_1$, $T_2$, and $T_3$. As stated earlier, in an exemplary embodiment, differential pairs of the torque signals $T_1$, $T_2$, and $T_3$ are employed. It will be appreciated that while in an exemplary embodiment differential pairs are disclosed, they are not a necessity. If fact, there may be instances where using a single signal will provide advantages over a differential pair as will be address further at a later point herein. At process block 110, a first comparison to formulate a first torque pair signal 210 is determined. The first torque pair signal 210 hereinafter also denoted $TQ_0$ is formulated as shown in equation 4. Similarly, at process block 112 a second comparison to formulate a second torque pair signal 212 is determined. The second torque pair signal 212 hereinafter also denoted $TQ_1$ is formulated as shown in equation 5. Likewise, at process block 114 a third comparison to formulate a third torque pair signal 214 is determined. The third torque pair signal 214 hereinafter also denoted $TQ_2$ is formulated as shown in equation 6. Finally, at process block 116 a fourth comparison to formulate a fourth torque pair signal 216 is determined. The fourth torque pair signal 216 denoted $TQ_3$ is formulated as shown in equation 7.

$$TQ_0 = (T_1 - T_2)G_0 \quad (4)$$

$$\begin{aligned} TQ_1 &= (T_1 - T_2)G_1 \\ &= [(K_1\tau + B) - (-K_1\tau + B)]G_1 \\ &= 2K_1\tau G_1 \end{aligned} \quad (5)$$

$$\begin{aligned} TQ_2 &= (T_1 - T_3)G_2 \\ &= [(K_1\tau + B) - (K_3\tau + B)]G_2 \\ &= (K_1 - K_3)\tau G_2 \end{aligned} \quad (6)$$

-continued $$\begin{aligned} TQ_3 &= (T_3 - T_2)G_3 \\ &= [(K_3\tau + B) - (-K_1\tau + B)]G_3 \\ &= (K_3 + K_1)\tau G_3 \end{aligned} \quad (7)$$

where $G_0$ is a known gain, in this instance that of an existing differential amplifier.

To facilitate selection of any one of the four torque pair signals $TQ_0$, $TQ_1$, $TQ_2$, and $TQ_3$ it will be appreciated that it would be desirable to scale each of the four to be equal. Therefore, setting $TQ_0=TQ_1=TQ_2=TQ_3$ the values for $G_1$, $G_2$ and $G_3$ may readily be determined, yielding:

$$G_1 = G_0$$

$$G_2 = 2K_1G_1/(K_1-K_3), \text{ and}$$

$$G_3 = 2K_1G_1/(K_3+K_1)$$

Returning now to FIG. 2 and the torque signal and diagnostics processing 100, the torque signals $T_1$, $T_2$, and $T_3$ may now be utilized to formulate diagnostic signals. In an exemplary embodiment, and plurality of diagnostic signals are formulated based upon signal to signal comparisons between the torque signal signals $T_1$, $T_2$, and $T_3$ as well as validity determinations on the individual torque signals $T_1$, $T_2$, and $T_3$.

In the figure for an exemplary embodiment, at process block 120, a first comparison between torque signals $T_1$ and $T_2$ formulates a first torque pair diagnostic signal 220. The first torque pair diagnostic signal 220 hereinafter also denoted $DiagTQ_1$ is determined as shown in equation 8. Similarly, at process block 122 a second comparison between torque signals $T_1$ and $T_3$ formulates a second torque pair diagnostic signal 222. The second torque pair diagnostic signal 222 hereinafter also denoted $DiagTQ_2$ is formulated as shown in equation 9. Likewise, at process block 124 a third comparison between torque signals $T_2$ and $T_3$ formulates a third torque pair diagnostic signal 224. The third torque pair diagnostic signal 224 hereinafter also denoted $DiagTQ_3$ is formulated as shown in equation 10. Finally, at process block 126 a fourth comparison between a differential of torque signals $T_1$ and $T_2$ and an existing hardware implementation of a similar differential formulates a fourth torque pair diagnostic signal 226 is determined. The fourth torque pair diagnostic signal 226 denoted $DiagTQ_0$ is formulated as shown in equation 11. It should be noted that the fourth torque pair diagnostic signal 226 denoted $DiagTQ_0$ is formulated as a comparison with one of the torque pair signals $TQ_1$, $TQ_2$, and $TQ_3$ respectively. The comparison may be selectable based on which of the torque pair signals $TQ_1$, $TQ_2$, and $TQ_3$ exhibits the most desirable characteristics at a selected time. For example, if the torque pair signal $TQ_3$ is not valid (based on other evaluations), then comparison could be based upon torque pair signals $TQ_1$, or $TQ_2$.

Recalling equations 1, 2, and 3 respectively, in an exemplary embodiment, the torque diagnostic signals are formulated as deterministic combinations of the torque signals $T_1$, $T_2$, and $T_3$ yielding known values ideally expected to remain constant regardless of torque measured. The torque diagnostic signals are computed as follows:

$$DiagTQ_1 = (T_1 + T_2) \quad (8)$$
$$= (K_1\tau + B) + (-K_1\tau + B)$$
$$= 2B$$

$$DiagTQ_2 = T_1 - (K_1/K_3)T_3 \quad (9)$$
$$= (K_1\tau + B) + (K_1/K_3)(K_3\tau + B)$$
$$= (1 - (K_1/K_3))B$$

$$DiagTQ_3 = (K_1/K_3)T_3 + T_2 \quad (10)$$
$$= (K_1/K_3)(K_3\tau + B) + (-K_1\tau + B)$$
$$= (1 + (K_1/K_3))B$$

$$DiagTQ_0 = \{(TQ_1, \text{ or } TQ_2, \text{ or } TQ_3) - [(T_1 - T_2)G_0]_{HARDWARE}\} \quad (11)$$
$$= \{(T_1 - T_2)G_1 - [(T_1 - T_2)G_0]_{HARDWARE}\} \text{ or}$$
$$= \{(T_1)G_2 - [(T_1 - T_2)G_0]_{HARDWARE}\} \text{ or}$$
$$= \{(T_3 - T_2)G_3 - [(T_1 - T_2)G_0]_{HARDWARE}\}$$
$$= 0$$

Returning once again to FIG. 2 and the torque signal and diagnostics processing 100, the torque signals $T_1$, $T_2$, and $T_3$ may once again be utilized to formulate diagnostic signals. In an exemplary embodiment, and plurality of diagnostic signals are formulated based upon validity determinations on the individual torque signals $T_1$, $T_2$, and $T_3$.

In the figure for an exemplary embodiment, at process block 130, an evaluation of the first torque signal $T_1$ formulates a first torque diagnostic signal 230. The first torque diagnostic signal 230 hereinafter also denoted $DiagT_1$ is determined as an evaluation of the known characteristics of the first torque signal $T_1$. For example, an evaluation such characteristics as the expected range, rate of change, and the like, as well as combinations including at least one of the foregoing of the torque signal. In an exemplary embodiment a range evaluation is performed. Similarly, at process block 132 an evaluation of the second torque signal $T_2$ formulates a second torque diagnostic signal 232. The second torque diagnostic signal 232 hereinafter also denoted $DiagT_2$ is determined as an evaluation of the known characteristics of the second torque signal $T_2$. In an exemplary embodiment a range evaluation is performed. Finally, at process block 134 an evaluation of the third torque signal $T_3$ formulates a third torque diagnostic signal 234. The third torque diagnostic signal 234 hereinafter also denoted $DiagT_3$ is determined as an evaluation of the known characteristics of the third torque signal $T_3$. In an exemplary embodiment a range evaluation is performed.

Continuing with FIG. 2 in exemplary embodiment, the torque signal and diagnostics processing 100 is executed to establish and select a desired measured torque signal 250 that exhibits robust fault tolerance and a fault status signal 260 indicative of the status of the torque signals $T_1$, $T_2$, and $T_3$. The four torque pair signals $TQ_0$, $TQ_1$, $TQ_2$, and $TQ_3$ are directed to a selection device 150 responsive to a select signal 262 and transmitting as the measured torque signal 250 a selected one of the four torque pair signals $TQ_0$, $TQ_1$, $TQ_2$, and $TQ_3$. Additionally, the four torque pair diagnostic signals $DiagTQ_1$, $DiagTQ_2$, $DiagTQ_3$, and $DiagTQ_0$ respectively and the three torque diagnostic signals $DiagT_1$, $DiagT_2$, and $DiagT_3$, respectively are transmitted to a signal selection and hysteresis process 160. The signal selection and hysteresis process 160 employs the above mentioned seven diagnostic signals in a combination to determine a likely best choice of the torque pair signals $TQ_0$, $TQ_1$, $TQ_2$, and $TQ_3$ to select and output as the measured torque signal 250. The signal selection and hysteresis process 160 generates the select signal 262 in response to the abovementioned diagnostic signals. In an exemplary embodiment, the determination may be weighted average as a function of the each diagnostic signal, as well as characteristics of the individual torque signals pair signals $TQ_0$, $TQ_1$, $TQ_2$, and $TQ_3$. For example, consideration may be given to the range variation of the torque pair signals $TQ_0$, $TQ_1$, $TQ_2$, and $TQ_3$ for a given torque. Additionally, also in response to the diagnostic signals the signal selection and hysteresis process 160 generates a fault status signal indicative of the status of the torque signals $T_1$, $T_2$, and $T_3$.

Referring once again to FIG. 3, at an arbitrary torque value denoted as $T_x$ also denoted 170, it should be noted that the range for the torque pair signal $TQ_0$ and $TQ_1$ denoted 172 are the largest, while the range for $TQ_3$ denoted 174 is smaller, with the range for $TQ_2$ denoted 176 being the smallest. Having a larger range for a particular torque, such as $T_x$ 170 improves input signal to noise ratio and provides enhanced signal resolution. Therefore, it is evident that the weighting provided in the signal selection and hysteresis process 160 would take advantage of this distinction. The output measured torque signal will be selected from either $TQ_0$, $TQ_1$, $TQ_2$, and $TQ_3$. or from a weighted combination thereof. Additionally, the signal(s) will be selected based on a combination of several criteria:

The signals exhibiting a better signal to noise ratios (higher gain) will take preference over signals exhibiting poorer signal to noise ratios (lower gain).

The corresponding diagnostic values e.g., $DiagTQ_1$, $DiagTQ_2$, $DiagTQ_3$, and $DiagTQ_0$ for each signal pair $TQ_0$, $TQ_1$, $TQ_2$, and $TQ_3$. may be evaluated for a valid signal threshold. Diagnostic values outside of a selected valid range will preclude the corresponding signals pair from being used.

The corresponding diagnostic for each individual signal's allowable range e.g., $DiagT_1$, $DiagT_2$, and $DiagT_3$, will be evaluated. Diagnostic values outside of a selected valid range will preclude the corresponding signals from being used.

The previous state (or last signal selected as the output) will be used to bias the selection of the current signal. This will be used to avoid switching between signals unless a valid fault exists.

In the exemplary embodiment described above, the torque pair signals $TQ_0$, $TQ_1$, $TQ_2$, and $TQ_3$ were each disclosed as being a function of a pair combination of the torque signals $T_1$, $T_2$, and $T_3$. As mentioned above, there may be instances where benefit may be achieved by not using a pairing of the torque signals $T_1$, $T_2$, and $T_3$ to formulate the torque pair signals $TQ_0$, $TQ_1$, $TQ_2$, and $TQ_3$. In another exemplary embodiment, consider FIG. 3 once again at the arbitrary torque $T_x$ 170, it will be appreciated that the range for torque signal $T_1$ alone (or $T_2$ for that matter) denoted as 178 exhibits a larger range for the arbitrary torque $T_x$ 170 than the torque pair $TQ_2$ denoted 176 as formulated in accordance with equation 6. Therefore, in another embodiment, the torque "pair" signal $TQ_2$ may instead just be a function of a single torque signal, in this instance, $T_1$ alone. Furthermore, the signal selection and hysteresis process 160 may also then include a weighting based upon $T_1$ alone. In this embodiment, the torque "pair" signal $TQ_2$ may be determined as follows:

$$TQ_2 = (T_1)G_2 \quad (12)$$
$$= (K_1\tau + B)G_2$$
$$= K_1\tau G_2 + BG_2$$

It should be apparent that the value B is a constant and may readily be approximated and canceled via initialization or other well known mathematical procedures yielding an approximate value for $TQ_2$ as follows:

$$TQ_2 = K_1\tau G_2 \quad (13)$$

The value for $TQ_2$ in equation 13 yielding a set of gain values for this embodiment as follows:

$G_1 = G_0$ $G_2 = 2 G_1$, and $G_3 = 2K_1G_1/(K_3+K_1)$

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of generating a fault tolerant sensor signal for a motor control system in a vehicle steering system comprising:
   receiving at least three sensor signals indicative of an amount of torque applied to said vehicle steering system;
   generating a plurality of torque pair signals responsive to said at least three sensor signals, each torque pair signal of said plurality of torque pair signals being based on at least two sensor signals of said three sensor signals;
   generating a plurality of diagnostic signals responsive to said at least three sensor signals, each diagnostic signal of said plurality of diagnostic signals indicating whether a corresponding torque pair signal from the plurality of torque pair signals is valid;
   selecting only one torque pair signal of said plurality of torque pair signals based on said plurality of diagnostic signals; and
   generating a measured torque signal indicative of the amount of torque applied to said vehicle steering system responsive to said selecting.

2. The method of claim 1 wherein each torque pair signal of said plurality of torque pair signals is a scaled difference of at least two of said at least three sensor signals.

3. The method of claim 1 wherein said a plurality of torque pair signals are configured as scaled versions of at least one of said at least three sensor signals.

4. The method of claim 1 wherein said a plurality of torque pair signals are scaled to be substantially equal.

5. The method of claim 1,
   wherein said selecting utilizes a signal selection and hysteresis process.

6. The method of claim 5 wherein said signal selection and hysteresis process is responsive to at least one of said at least three sensor signals.

7. The method of claim 5 wherein said signal selection and hysteresis process determines a weighted combination of at least one of said at least three sensor signals.

8. The method of generating a fault-tolerant sensor signal for a motor control system in a vehicle steering system comprising:
   receiving at least three sensor signals indicative of a sensed parameter;
   generating a plurality of parameter pair signals responsive to at least one sensor signal of said at least three sensor signals;
   selecting one parameter pair signal of said plurality of parameter pair signals;
   generating a measured parameter signal responsive to said selecting; and
   wherein said at least three sensor signals are torque signals defined as:

$T1 = K1\tau + B$ $T2 = -K1\tau + B$ $T3 = K3\tau + B$ where; $K_1$ is a slope or gain ratio for the torque response in output units/torque unit
   K3 is a slope or gain ratio for the torque response in output units/torque unit
   $\tau$ is the actual torque as sensed by the sensor in torque units
   B is a voltage offset of the sensor in output units.

9. A system for generating a fault tolerant sensor signal for a motor control system in a vehicle steering system comprising:
   at least three torque sensors generating and transmitting at least three sensor signals indicative of an amount of torque applied to said vehicle steering system;
   a controller operatively coupled to said at least three torque sensors;
   said controller configured to receive said at least three sensor signals said controller further configured to generate a plurality of torque pair signals responsive to at least one sensor signal of said at least three sensor signals;

said controller further configured to generate a plurality of diagnostic signals responsive to said at least three sensor signals, each diagnostic signal of said plurality of diagnostic signals indicating whether a corresponding torque pair signal from the plurality of torque pair signals is valid;

said controller further configured to select only one torque pair signal of said plurality of torque pair signals based on said plurality of diagnostic signals; and said controller further configured to generate a measured torque signal responsive to said selecting.

10. The system of claim 9 wherein said a plurality of torque pair signals is a scaled difference of at least two of said at least three sensor signals.

11. The system of claim 9 wherein said a plurality of torque pair signals are configured as scaled versions of at least one of said at least three sensor signals.

12. The system of claim 9 wherein said a plurality of torque pair signals are scaled to be substantially equal.

13. The system of claim 9,
wherein said selecting utilizes a signal selection and hysteresis process.

14. The system of claim 13 wherein said signal selection and hysteresis process is responsive to a at least one of said at least three sensor signals.

15. The system of claim 13 wherein said signal selection and hysteresis process determines a weighted combination responsive to at least one of said at least three sensor signals.

16. The method of generating a fault tolerant sensor signal for a motor control system in a vehicle steering system comprising:

at least three parameter sensors generating and transmitting at least three sensor signals indicative of a sensed parameter;

a controller operatively coupled to said at least three parameter sensors;

said controller executing method for generating a fault-tolerant sensor signal comprising: and receiving at least three sensor signals indicative of a sensor parameter;

generating a plurality of parameter pair signals responsive to at least one sensor signal of said at least three sensor signals;

selecting one parameter pair signal of said plurality of parameter pair signals;

generating a measured parameter signal responsive to said selecting; and wherein said at least three sensor signals are torque signals defined as:

$T1 = K1\tau + B$ $T2 = K1\tau + B$ $T3 = K3\tau + B$ where; K1 is a slope or gain ratio for the torque response in output units/torque unit K3 is a slope or gain ratio for the torque response in output units/torque unit $\tau$ is the actual torque as sensed by the sensor in torque units B is a voltage offset of the sensor in output units.

17. A storage medium encoded with a machine-readable computer program code for generating a fault tolerant sensor signal for a motor control system in a vehicle steering system, said storage medium including instructions for causing controller to implement a method comprising:

receiving at least three sensor signals indicative of a torque applied to said vehicle steering system;

generating a plurality of torque pair signals responsive to said at least three sensor signals, each torque pair signal of said plurality of torque pair signals being based on at least two sensor signals of said three sensor signals;

generating a plurality of diagnostic signals responsive to said at least three sensor signals, each diagnostic signal of said plurality of diagnostic signals indicating whether a corresponding torque pair signal from the plurality of torque pair signals is valid;

selecting one torque pair signal of said plurality of torque pair signals based on said plurality of diagnostic signals; and generating a measured torque signal indicative of the amount of torque applied to said vehicle steering system responsive to said selecting.

* * * * *